United States Patent
Nakamura

(10) Patent No.: US 9,868,334 B2
(45) Date of Patent: Jan. 16, 2018

(54) INSTALLATION STRUCTURE FOR VEHICLE-MOUNTED DEVICE

(71) Applicant: MAZDA MOTOR CORPORATION, Hiroshima (JP)

(72) Inventor: Yoshio Nakamura, Hiroshima-shi (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 14/958,417

(22) Filed: Dec. 3, 2015

(65) Prior Publication Data
US 2016/0176443 A1    Jun. 23, 2016

(30) Foreign Application Priority Data

Dec. 18, 2014   (JP) .................. 2014-255955

(51) Int. Cl.
*B60R 21/00*       (2006.01)
*B60R 21/04*       (2006.01)
(Continued)

(52) U.S. Cl.
CPC ..... *B60H 1/00507* (2013.01); *B60H 1/00521* (2013.01); *B60H 1/00978* (2013.01);
(Continued)

(58) Field of Classification Search
CPC ............ B60R 2021/0027; B60R 21/04; B60R 21/045; B62D 25/14; B62D 25/142; B62D 25/145; H04W 4/02; H04W 4/22; B60K 37/00; B60K 37/02; B60K 37/04; B60H 1/00507; B60H 1/00521; B60H 1/00978

See application file for complete search history.

(56) References Cited

U.S. PATENT DOCUMENTS 6,073,987 A * 6/2000 Lindberg ............... B62D 65/14
                                                                180/90
6,843,521 B1 * 1/2005 Oana .................... B62D 25/145
                                                                180/90
(Continued)

FOREIGN PATENT DOCUMENTS

CN        204340702 U      5/2015
JP        S58-109356 U     7/1983
(Continued)

OTHER PUBLICATIONS

CN Office Action dated Jun. 20, 2017 from corresponding CN Appl No. 201510926830.1, with English summary, 7 pp.
(Continued)

*Primary Examiner* — Gregory Blankenship
(74) *Attorney, Agent, or Firm* — Studebaker & Brackett PC

(57) ABSTRACT

An installation structure for a vehicle-mounted device is provided with an air conditioning unit disposed on the rear side of a dashboard panel separating an engine room and a vehicle chamber, and internally including an air passage through which conditioned air is allowed to flow; and an emergency call device disposed on the rear side of the air conditioning unit, and configured to perform an emergency call to a service center on the outside of a vehicle at a time of vehicle collision. This is advantageous in protecting the emergency call device at the time of frontal collision of the vehicle.

19 Claims, 14 Drawing Sheets

(51) Int. Cl.
  *B60H 1/00* (2006.01)
  *H04W 4/02* (2009.01)
  *H04W 4/22* (2009.01)
(52) U.S. Cl.
  CPC .............. *H04W 4/22* (2013.01); *B60R 21/04* (2013.01); *B60R 2021/0027* (2013.01); *H04W 4/02* (2013.01)

(56) References Cited

U.S. PATENT DOCUMENTS

| | | | |
|---|---|---|---|
| 9,457,754 B1* | 10/2016 | Christensen | B60R 21/0136 |
| 2003/0193207 A1* | 10/2003 | Ito | B60H 1/0055 |
| | | | 296/72 |
| 2003/0232591 A1 | 12/2003 | Nanaumi et al. | |
| 2004/0242026 A1* | 12/2004 | Glovatsky | B62D 25/14 |
| | | | 439/34 |
| 2006/0191704 A1* | 8/2006 | Riester | B60R 16/0215 |
| | | | 174/72 A |
| 2007/0245758 A1* | 10/2007 | Binder | B60H 1/0055 |
| | | | 62/259.4 |
| 2008/0048470 A1* | 2/2008 | Vican | B62D 25/145 |
| | | | 296/193.02 |
| 2008/0218321 A1 | 9/2008 | Sakai et al. | |
| 2008/0284198 A1* | 11/2008 | Ryu | B60R 11/0235 |
| | | | 296/70 |
| 2009/0024275 A1* | 1/2009 | Hayes | B60K 35/00 |
| | | | 701/36 |
| 2009/0168974 A1* | 7/2009 | McCormick | H04M 11/04 |
| | | | 379/45 |
| 2009/0261612 A1* | 10/2009 | Takayama | B60K 37/02 |
| | | | 296/70 |
| 2010/0259063 A1* | 10/2010 | Wippler | B60R 16/0215 |
| | | | 296/70 |
| 2010/0327627 A1* | 12/2010 | Leanza | B62D 29/008 |
| | | | 296/190.01 |
| 2011/0023628 A1 | 2/2011 | Hamabe et al. | |
| 2011/0187144 A1* | 8/2011 | Kwolek | B62D 25/14 |
| | | | 296/37.8 |
| 2012/0049574 A1* | 3/2012 | Atsumi | B62D 25/145 |
| | | | 296/193.02 |
| 2013/0267194 A1* | 10/2013 | Breed | H04W 4/22 |
| | | | 455/404.2 |
| 2014/0295885 A1* | 10/2014 | Marko | H04W 4/02 |
| | | | 455/456.1 |
| 2015/0217624 A1* | 8/2015 | Herr-Rathke | B62D 25/08 |
| | | | 296/193.02 |
| 2015/0217711 A1* | 8/2015 | Kawada | B60R 21/00 |
| | | | 701/31.5 |
| 2016/0059900 A1* | 3/2016 | Eshima | B62D 25/145 |
| | | | 296/187.09 |
| 2016/0176443 A1* | 6/2016 | Nakamura | B60H 1/00507 |
| | | | 296/24.4 |

FOREIGN PATENT DOCUMENTS

| | | |
|---|---|---|
| JP | 2004-017852 A | 1/2004 |
| JP | 2008-029084 A | 2/2008 |
| JP | 2008-213714 A | 9/2008 |
| JP | 2009-234379 A | 10/2009 |
| JP | 2011-011639 A | 1/2011 |

OTHER PUBLICATIONS

An Office Action; "Notification of Reasons for Refusal," issued by the Japanese Patent Office dated Dec. 20, 2017, which corresponds to Japanese Patent Application No. 2014-255955 and is related to U.S. Appl. No. 14/958,417; with English language translation.

An Office Action; "Notification of Reasons for Refusal," issued by the Japanese Patent Office dated Dec. 20, 2017, which corresponds to Japanese Patent Application No. 2014-255957 and is related to U.S. Appl. No. 14/958,417; with English language translation.

\* cited by examiner

INSTALLATION STRUCTURE FOR VEHICLE-MOUNTED DEVICE

TECHNICAL FIELD

The present invention relates to an installation structure for a vehicle-mounted device, and more particularly, to an installation structure for an emergency call device which performs an emergency call to a service center on the outside of vehicles at the time of vehicle collision.

BACKGROUND ART

As disclosed in Japanese Unexamined Patent Publication No. 2008-213714, some of the vehicles are installed with an emergency call device which performs an emergency call to a service center on the outside of the vehicles at the time of vehicle collision. Further, Japanese Unexamined Patent Publication No. 2009-234379 discloses installing a vehicle-mounted device at a position between left and right seats where deformation is relatively less likely to occur at the time of vehicle collision.

It is desirable that the emergency call device is operated at the time of collision in any direction. In view of the above, as disclosed in the above Publication No. 2009-234379, there is proposed installing an emergency call device in a center console disposed between left and right seats. However, it may be difficult or impossible to secure a sufficient space in the center console for installing an emergency call device, taking into consideration that an air conditioning unit for rear seats and other vehicle-mounted devices are installed in the center console.

Meanwhile, it is often the case that attachment devices such as a portable telephone antenna, a GPS antenna, a microphone, and a speaker for an emergency call device are respectively installed on the rear side of a dashboard panel separating an engine room and a vehicle chamber (e.g. in an instrument panel). In view of the above, there is proposed installing an emergency call device on the rear side of a dashboard panel, taking into consideration that it is easy to connect the emergency call device to the attachment devices such as a portable telephone antenna. In this case, however, it is desirable to effectively protect the emergency call device at the time of frontal collision of a vehicle, taking into consideration that the dashboard panel may be deformed rearward at the time of frontal collision of the vehicle.

SUMMARY OF INVENTION

In view of the above, an object of the invention is to provide a configuration that enables to effectively protect an emergency call device installed on the rear side of a dashboard panel at the time of frontal collision of a vehicle.

An installation structure for a vehicle-mounted device of the invention which accomplishes the aforementioned object includes an air conditioning unit disposed on the rear side of a dashboard panel separating an engine room and a vehicle chamber, and internally including an air passage through which conditioned air is allowed to flow; and an emergency call device disposed on the rear side of the air conditioning unit, and configured to perform an emergency call to a service center on the outside of a vehicle at a time of vehicle collision.

These and other objects, features and advantages of the present invention will become more apparent upon reading the following detailed description along with the accompanying drawings.

DESCRIPTION OF EMBODIMENTS

Figure 1:
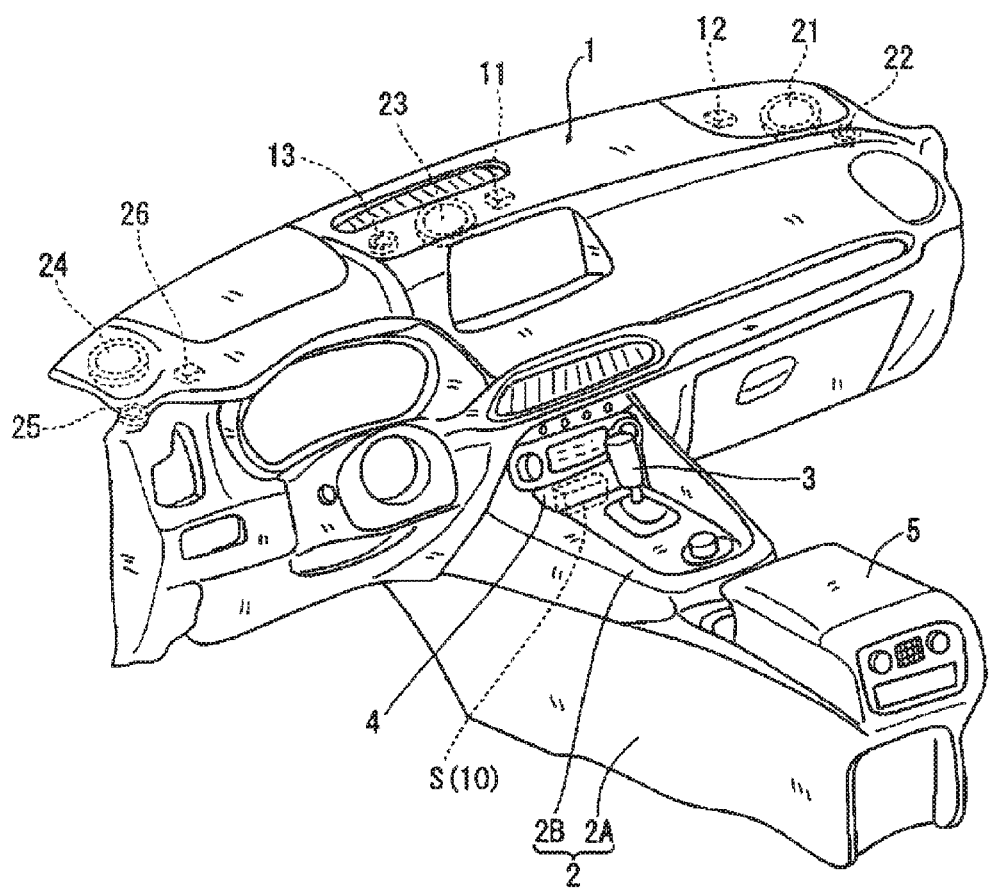
FIG. 1 is a perspective view illustrating a instrument panel portion of a vehicle to which an embodiment of the invention is applied.
Figure 2:
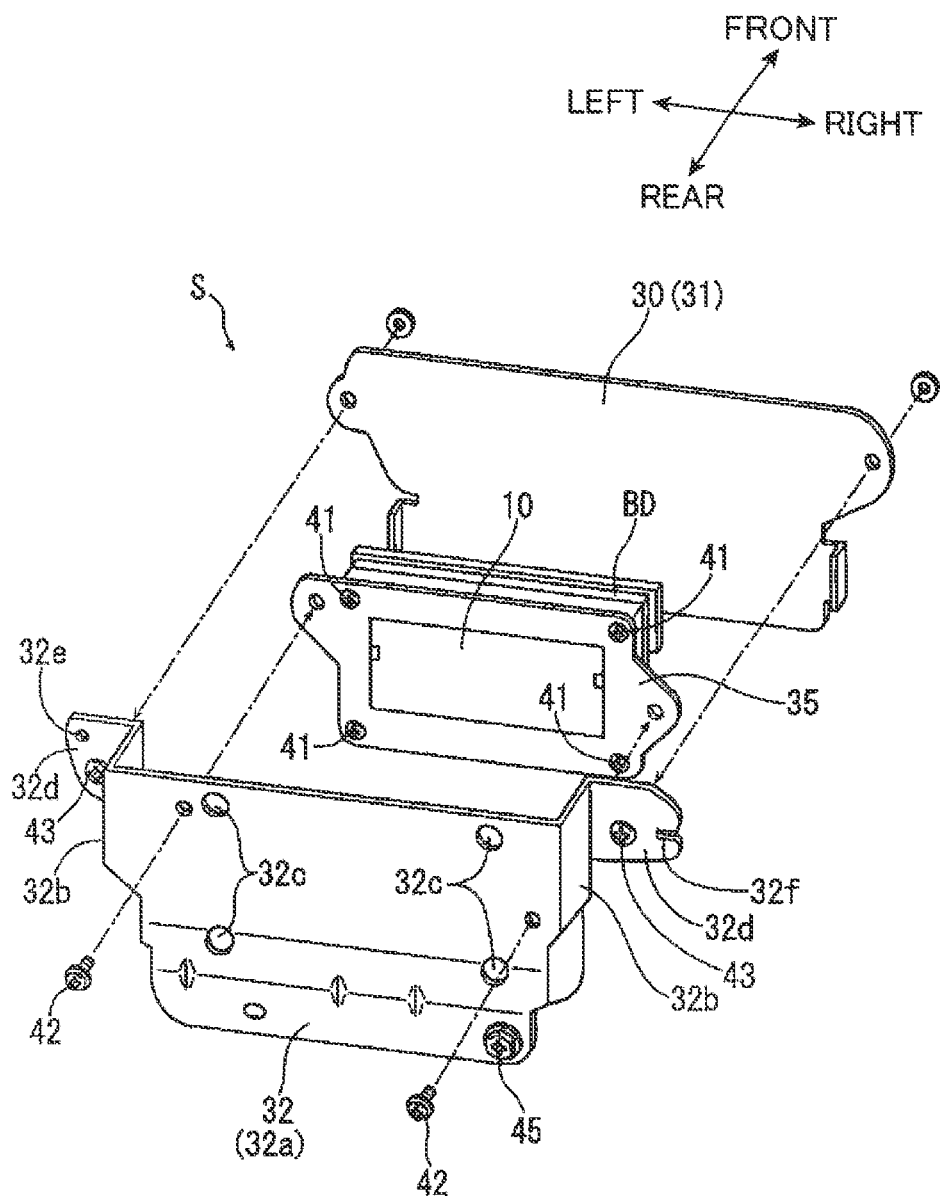
FIG. 2 is an exploded perspective view of an emergency call device and a protection member.
Figure 3:
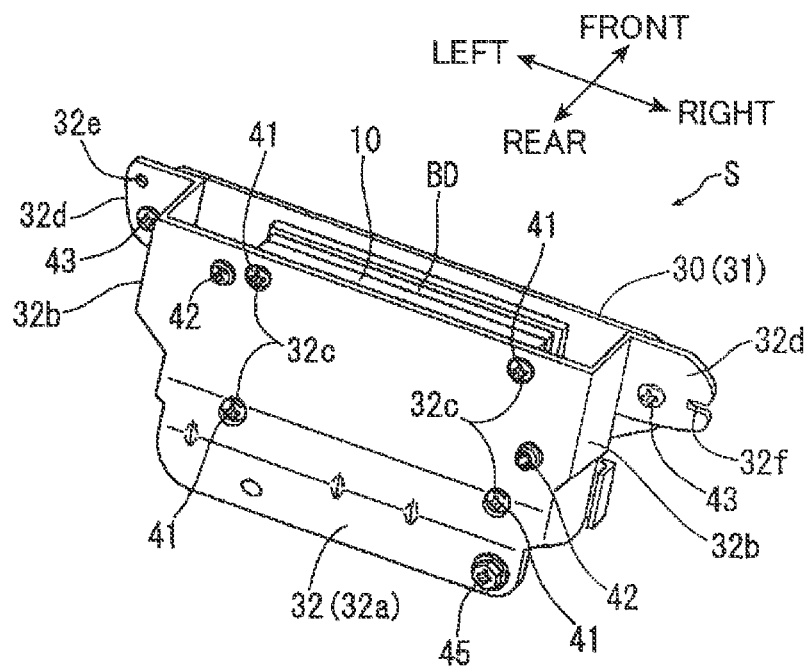
FIG. 3 is a perspective view of an assembly of the emergency call device and the protection member when viewed obliquely from the rear side.
Figure 4:
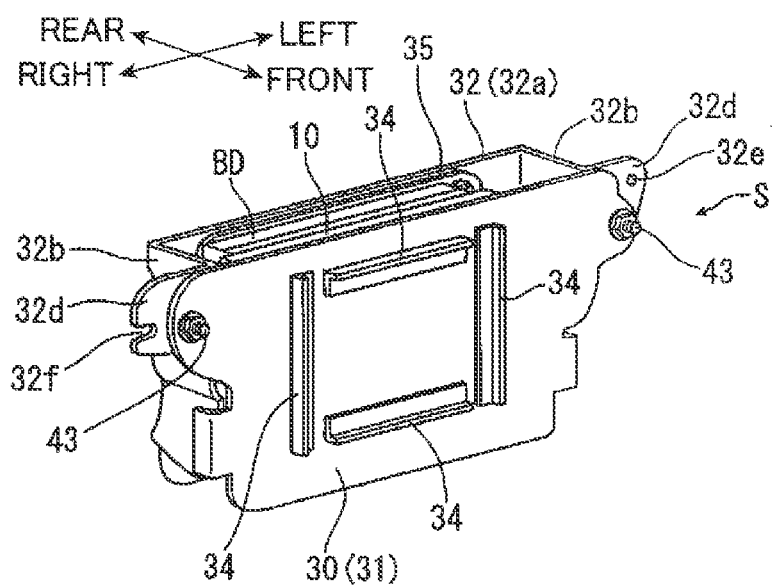
FIG. 4 is a perspective view of the assembly of the emergency call device and the protection member when viewed obliquely from the front side.
Figure 5:
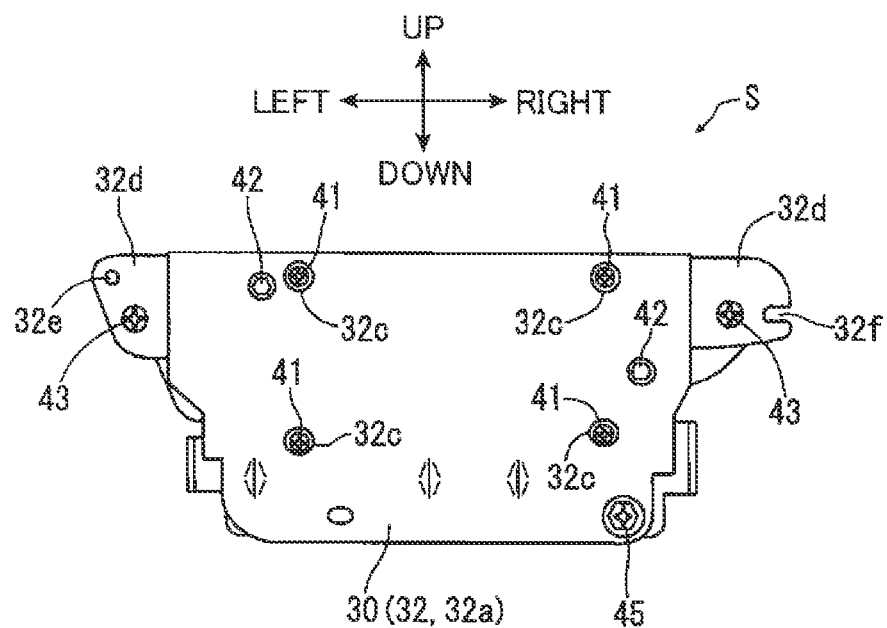
FIG. 5 is a rear view of the assembly of the emergency call device and the protection member when viewed from the rear side.
Figure 6:
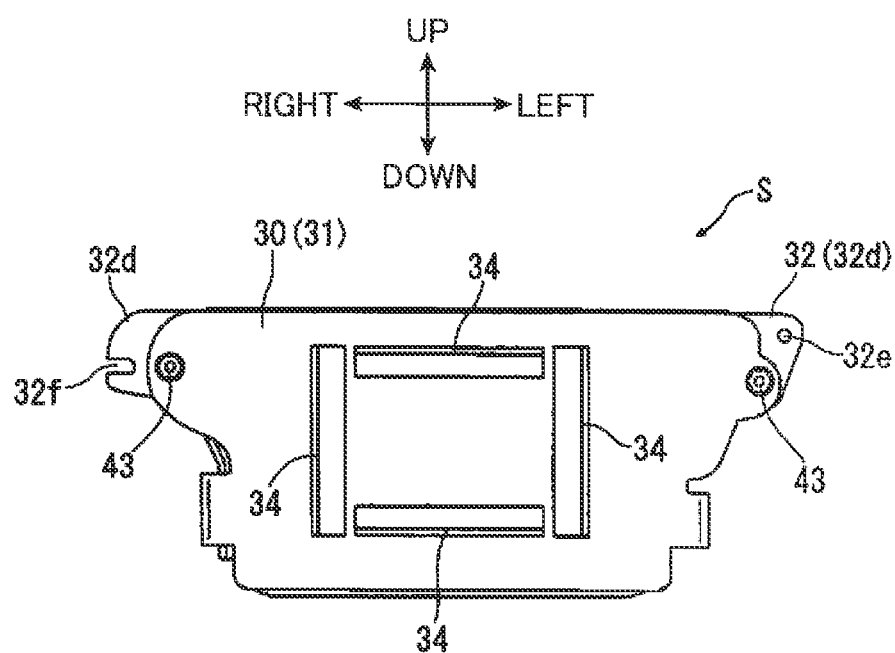
FIG. 6 is a front view of the assembly of the emergency call device and the protection member when viewed from the front side.
Figure 7:
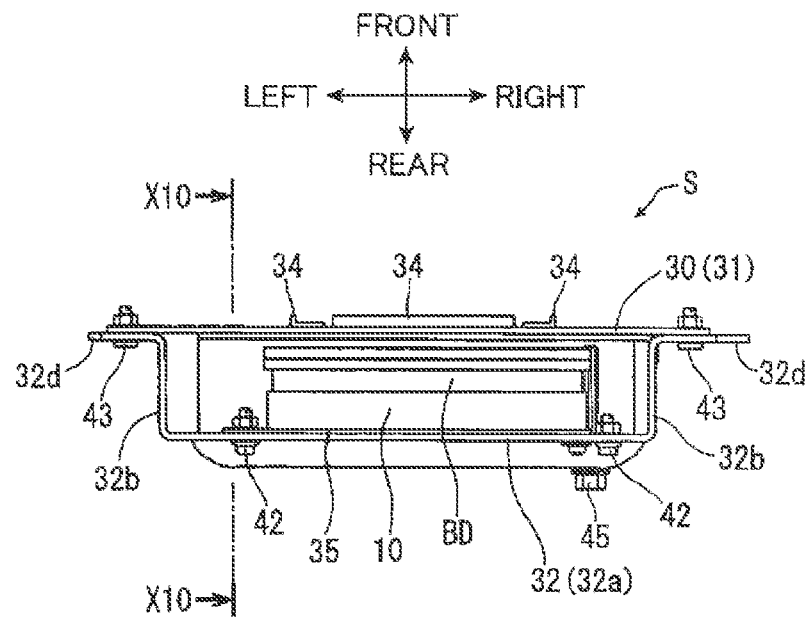
FIG. 7 is a top plan view of FIG. 5 when viewed from above.

Referring to FIG. 1, the reference sign 1 indicates an instrument panel. In the embodiment, a vehicle is a left-hand drive vehicle. The reference sign 2 indicates a center console. In the embodiment, the center console 2 includes an elongated body portion 2A extending in the front-rear direction, and an upper portion 2B fixed to the upper surface of the front portion of the body portion 2A. A shift lever (a select lever) 3 is disposed on the upper portion 2B. The front portion of the upper portion 2B is formed into a recess portion 4. The recess portion 4 is opened rearward for placing small articles therein. An accommodatable armrest portion 5 is formed on the upper surface of the rear portion of the body portion 2A.

An emergency call device 10 which performs an emergency call to a service center on the outside of the vehicle at the time of vehicle collision is installed in the center position of the rear portion of the instrument panel 1 in the vehicle width direction. Further, a portable telephone antenna 11, a satellite receiving antenna 12, and a speaker 13 as attachment devices to be respectively connected to the emergency call device 10 are installed in the instrument panel 1. In addition to the aforementioned members, a microphone (not illustrated) is disposed near a rearview mirror on the ceiling of the vehicle chamber, as the attachment devices of the emergency call device 10. At the time of vehicle collision, the emergency call device 10 receives a detection signal indicating the collision, and automatically notifies the service center of the collision. Further, the emergency call device 10 transmits the position of the driver's vehicle to the service center, and handles communication (call) between the passenger and the service center.

The instrument panel 1 is equipped with audio speakers 21 to 25, and a GPS antenna 26 for a car navigation device, in addition to the emergency call device 10 and the attachment devices thereof.

Next, a structure of the emergency call device 10 and of the peripheral components thereof is described referring to FIGS. 2 to 11. The emergency call device 10 integrally includes a backup power supply BD on the front surface thereof (on the surface corresponding to the vehicle front side). Specifically, the emergency call device 10 is basically operated by power supply from a battery power supply. However, when power supply from the battery power supply cannot be expected at the time of vehicle collision, the operation of the emergency call device 10 is secured by power supply from the backup power supply BD.

The emergency call device 10 including the backup power supply BD is surrounded by a protection member 30 at a position except from above and from below the emergency call device 10. The protection member 30 has a two-part configuration constituted by a front member 31 and a rear member 32, which are detachably attachable to each other.

The front member 31 is constituted by a metal plate such as a flat-shaped iron plate. The front member 31 is disposed to cover the front side of the emergency call device 10. The area of the front member 31 is sufficiently larger than the area of the emergency call device 10 so that the emergency call device 10 is disposed within the area of the front member 31.

A plurality of protrusions 34 are formed on the front surface of the front member 31 to project toward the front side. Specifically, a plurality of angle members formed by e.g. folding an iron plate into an L-shape in section are prepared. A portion corresponding to one side of each of the L-shaped angle members is fixed to the front surface of the front member 31. Thus, a portion corresponding to the other side of each of the L-shaped angle members is formed as the protrusion 34. In the embodiment, four angle members, more specifically, two vertical angle members linearly extending in the up-down direction, and two horizontal angle members linearly extending in the left-right direction (vehicle width direction) are prepared. The four linear protrusions 34 projecting toward the front side are formed by fixing the four angle members to the front member 31 with a positional relationship such that the angle members define a substantially rectangular frame shape.

The protrusions 34 are components for promoting breakage of an air conditioning unit to be described later when the air conditioning unit installed on the front side of the front member 31 is retracted and displaced. In view of the above, the shape to be defined by the linear protrusions 34 may be any other polygonal frame shape such as a substantially triangular frame shape. Further, each of the protrusions 34 may have any shape such as a curved shape, in place of a linear shape, or a shape such that the tip of the protrusion has a round projection or an angular projection. Further, it is possible to form the protrusions 34 by using an appropriate member such as a stud bolt or a bracket.

The rear member 32 is formed by bending a metal plate such as an iron plate. The rear member 32 includes a main portion 32a which covers the rear surface of the emergency call device 10, and a pair of left and right side portions 32b formed by folding the main portion 32a at a substantially right angle from the left and right ends thereof toward the front side. The area of the rear member 32 is set sufficiently larger than the area of the emergency call device 10 so that the emergency call device 10 is disposed within the area of the rear member 32. Further, the distance between the left and right side portions 32b is set sufficiently larger than the length of the emergency call device 10 in the left-right direction (vehicle width direction).

An annular connection member 35 (see FIG. 2 and FIG. 4) formed by punching a metal plate such as an iron plate is fixed to the rear surface of the emergency call device 10 by screws 41. In the embodiment, the connection member 35 is fixed to the emergency call device 10 by the four screws 41 located at four corners of the connection member 35. The main portion 32a of the rear member 32 is fixed to the connection member 35 from the rear side by a pair of left and right screws 42.

A head of each screw 41 for fastening the emergency call device 10 to the connection member 35 is formed into a convex portion projecting rearward. The main portion 32a of the rear member 32 is formed with an engagement hole 32c for receiving the head (convex portion) of each screw 41. Specifically, the rear member 32 and the connection member 35 are connected to each other by the screws 42 in a state that the heads of the screws 41 are engaged in the engagement holes 32c, and that the connection member 35 (consequently, the emergency call device 10) and the rear member 32 are positioned to each other.

A flange portion 32d extending to the outer side in the vehicle width direction is formed on the front edge of each of the side portions 32b of the rear member 32. The flange portions 32d are fixed from the rear side by screws 43 in a state that the flange portions 32d are mounted on the rear surface of the front member 31. One of the flange portions 32d is formed with a mounting hole 32e for mounting the emergency call device 10 to the vehicle body (a center stay 72 to be described later). The mounting hole 32e is a circular hole. Further, the other of the flange portions 32d is formed with a mounting hole 32f for mounting the emergency call device 10 to the vehicle body (an auxiliary stay 73 to be described later). The mounting hole 32f has an elongated slit shape in the vehicle width direction, and an outer end (right end) of the mounting hole 32*f* in the vehicle width direction is opened.

An assembly S illustrated in FIGS. 3 to 10 is an integral unit obtained by assembling the emergency call device 10 including the backup power supply BD together with the protection member 30 (the front member 31 and the rear member 32) and the connection member 35. In the assembled state of the assembly S, a gap is formed between the emergency call device 10 and the front member 31 in the front-rear direction (see e.g. FIG. 7, FIG. 8, and FIG. 10). Further, the left and right side portions 32*b* of the rear member 32 are disposed sufficiently away from each other with respect to the side surface of the emergency call device 10.

Figure 9:
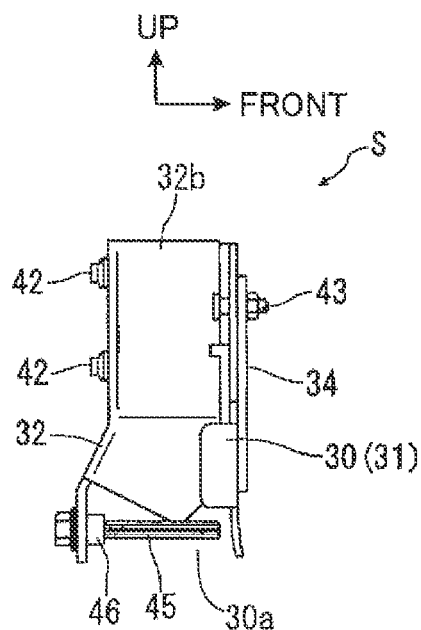
FIG. 9 is a right side view of FIG. 5 when viewed from the right side.
Figure 10:
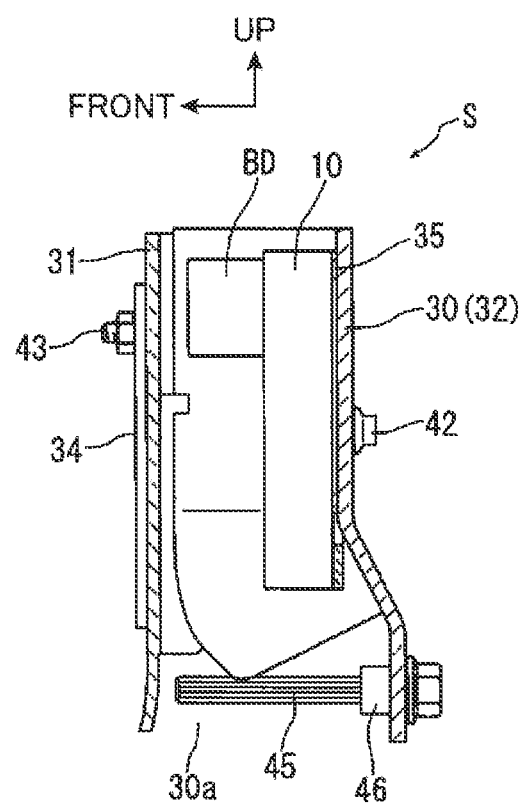
FIG. 10 is a sectional view taken along the line X10-X10 in FIG. 7.

An opening portion 30*a* (corresponding to an opening portion for mounting and dismounting in the claims) is formed in the lower surface of the protection member 30. The opening portion 30*a* has a size capable of placing the emergency call device 10 including the backup power supply BD together with the connection member 35 in and out of the protection member 30. Specifically, as illustrated in FIG. 9 and FIG. 10, the opening width of the opening portion 30*a* in the front-rear direction is set sufficiently large by slightly inclining the front member 31 such that the lower end of the front member 31 is located on the front side, as the front member 31 extends downward, and by forming the rear member 32 such that the lower end of the rear member 32 projects largely rearward. In other words, the protection member 30 is formed such that the front-rear width of the lower end thereof which defines the opening portion 30*a* is set larger than the front-rear width of the other portion thereof (the upper end and the intermediate portion in the up-down direction). According to this configuration, it is easy to place a combination of the emergency call device 10 and the connection member 35 in and out of the protection member 30.

In order to facilitate placing the combination of the emergency call device 10 and the connection member 35 in and out of the protection member 30, the positions of the screws 42 for fixing the rear member 32 and the connection member 35 are set on the inner side in the vehicle width direction than the positions of the screws 43 for use in fixing the front member 31 and the rear member 32, and the positions of the mounting holes 32*e* and 32*f* for mounting the protection member 30 to the vehicle body. According to this configuration, it is possible to prevent interference of the combination with the screws 43, and with screws (screws 75 and 76 to be described later) passing through the mounting holes 32*e* and 32*f* when the combination of the emergency call device 10 and the connection member 35 is placed in and out of the protection member 30.

Figure 8:
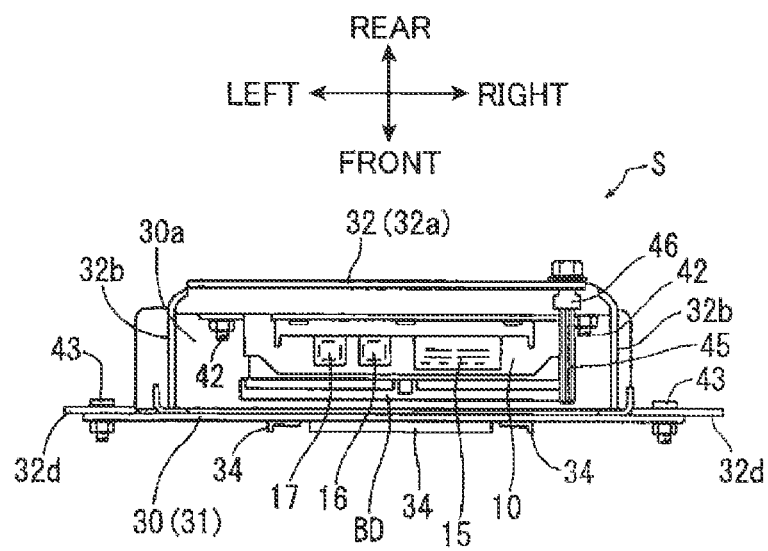
FIG. 8 is a bottom plan view of FIG. 5 when viewed from below.
Figure 11:
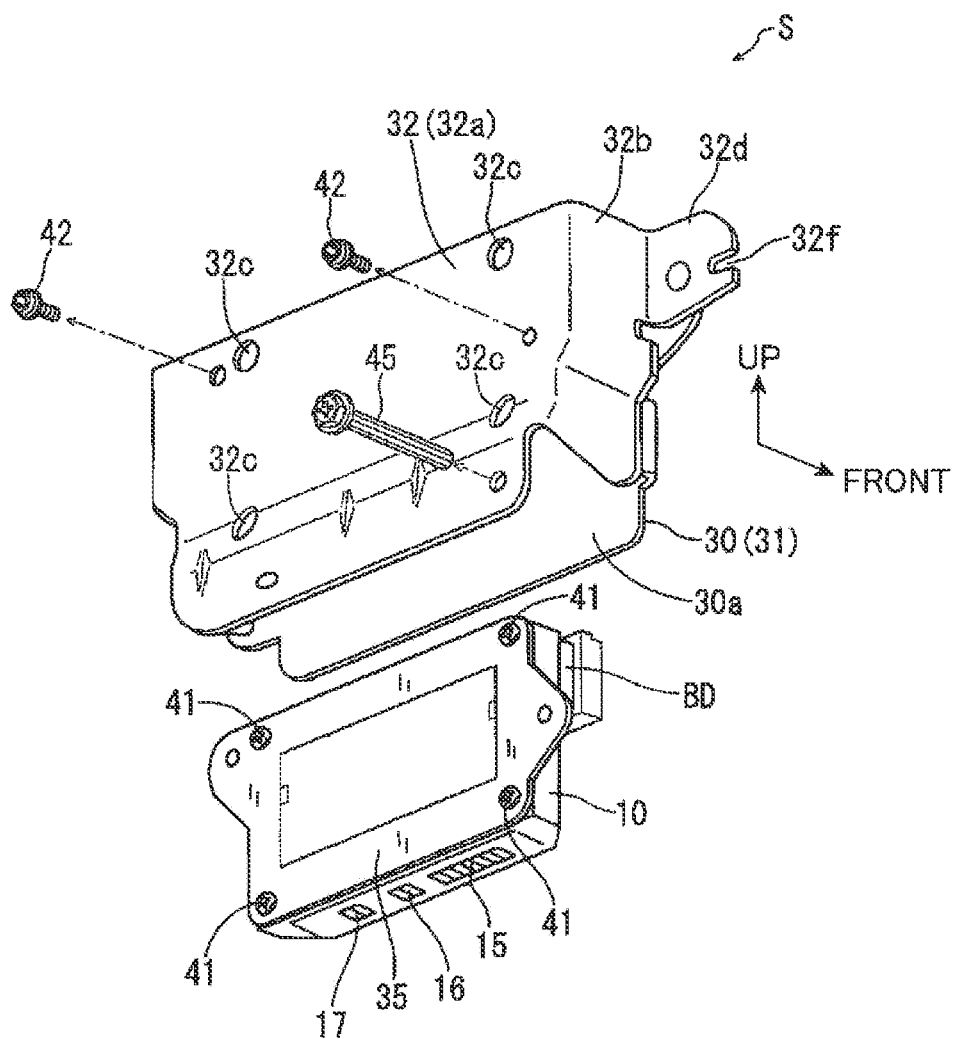
FIG. 11 is a perspective view illustrating a state immediately after the emergency call device is dismounted from the protection member together with a backup power supply and a connection member for the emergency call device from below the protection member.

The emergency call device 10 includes connector portions 15 to 17 to which a power supply harness connected to a battery, and a transmitting/receiving harness connected to the attachment devices 11 to 13 are to be connected (see FIG. 8 and FIG. 11). The connector portions 15 to 17 are disposed on the lower surface of the emergency call device 10 to face downward (toward the opening portion 30*a* of the protection member 30) in a state that the assembly S is formed. This makes it easy to connect the harnesses to be connected to the emergency call device 10 to the connector portions 15 to 17 through the opening portion 30*a*.

A stopper member 45 extending in the front-rear direction while traversing the opening portion 30*a* is mounted on the lower end of the right portion of the protection member 30 in order to prevent narrowing the distance between the rear member 32 (the main portion 32*a*) and the front member 31 in the front-rear direction at the time of vehicle collision. In the embodiment, the stopper member 45 is constituted by a bolt fixed to the main portion 32*a* of the rear member 32 via a nut 46. The stopper member 45 fixed to the main portion 32*a* extends to the front side, and the tip of the stopper member 45 is disposed at a position immediately close to the rear surface of the front member 31. According to this configuration, it is possible to prevent the front member 31 from coming close to or coming into contact with the emergency call device 10 when a rearward external force is exerted on the front member 31 at the time of vehicle collision.

The emergency call device 10 mounted to the protection member 30 is capable of being dismounted from the protection member 30 from below in a state that the stopper member 45 and the screws 42 are removed. Specifically, as illustrated in FIG. 11, it is possible to dismount the emergency call device 10 including the backup power supply BD together with the connection member 35 from the protection member 30 through the opening portion 30*a* formed in the lower surface of the protection member 30 by removing the stopper member 45 and the screws 43 from the protection member 30 from the rear side.

Figure 12:
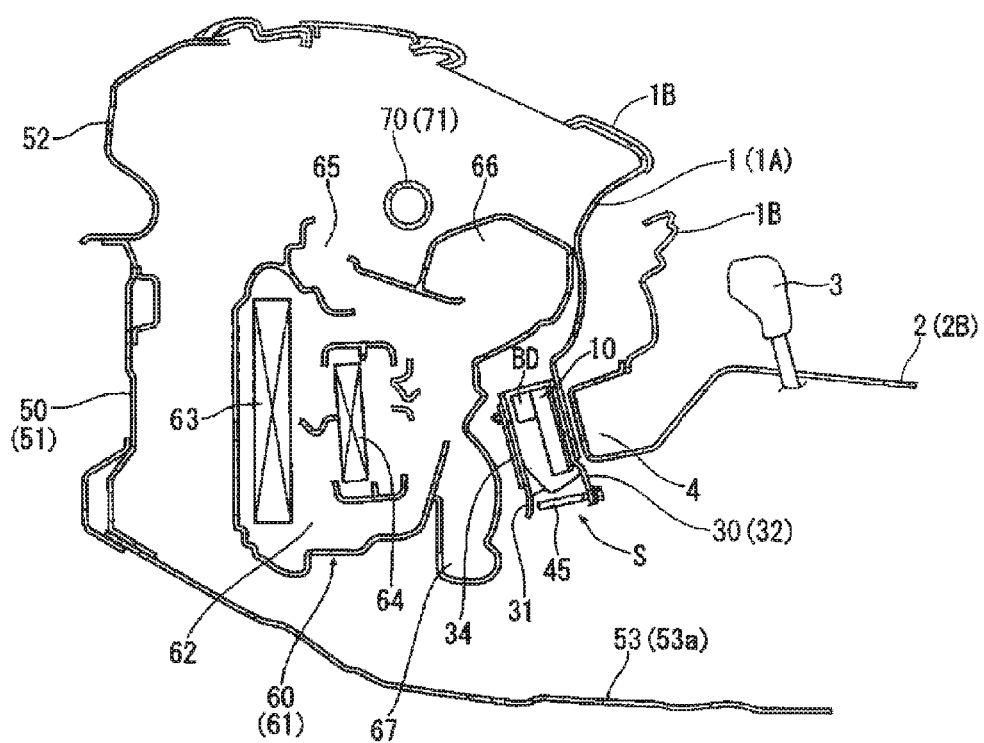
FIG. 12 is a side sectional view illustrating an installation state of the assembly including the emergency call device in a front portion of a vehicle chamber.
Figure 13:
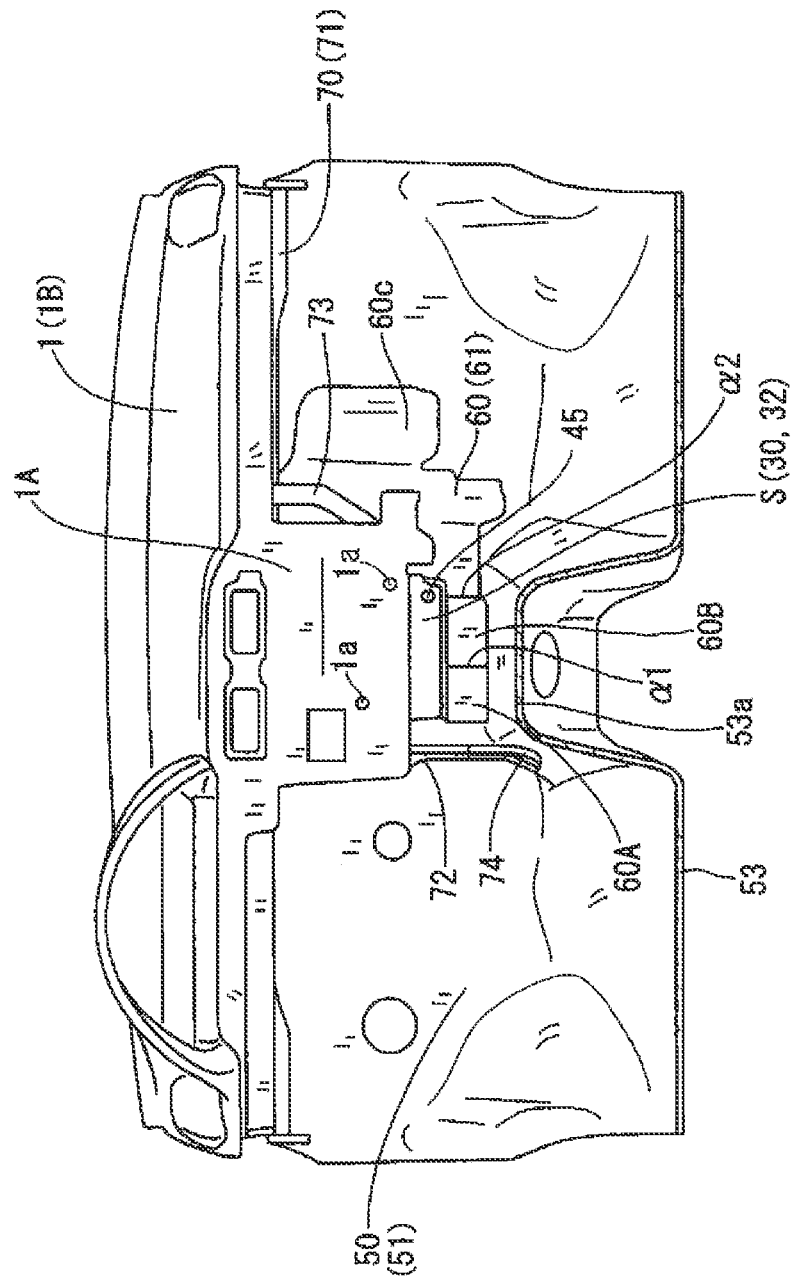
FIG. 13 is a diagram illustrating a state that a lower portion of an outer cover member of a center console and an instrument panel is dismounted from the state illustrated in FIG. 12 when viewed from the rear side of the vehicle chamber.

Next, a vehicle body structure in the vicinity of the emergency call device 10 is described referring to FIG. 12 and FIG. 13. The reference sign 50 indicates a dashboard panel separating an engine room and the vehicle chamber. The dashboard panel 50 includes a dashboard panel lower member 51 and a dashboard panel upper member 52. The dashboard panel 50 is formed to extend in the up-down direction on the front side than the instrument panel 1. A floor panel 53 extending in the front-rear direction is jointed to the lower end of the dashboard panel 50. A tunnel portion 53*a* bulging upward and extending in the front-rear direction is formed in the center portion of the floor panel 53 in the vehicle width direction. The center console 2 is mounted in such a manner as to cover the front portion of the tunnel portion 53*a* from above.

An air conditioning unit 60 is installed in the instrument panel 1 on the rear side of the dashboard panel 50. As illustrated in FIG. 12, as is well-known, the air conditioning unit 60 includes a case 61 which constitutes an outer shell of the air conditioning unit 60, an air passage 62 (a passage through which conditioned air is allowed to flow) formed in the case 61, and an evaporator 63 and a heater core 64 disposed at respective predetermined positions in the air passage 62.

Conditioned air discharge passages 65, 66, and 67 constituting a part (a distal end) of the air passage 62 are formed at appropriate positions in the case 61. The discharge passage 65 communicates with a defroster outlet port through which conditioned air is allowed to flow upward from the upper surface of the front portion of the instrument panel 1. The discharge passage 66 communicates with a rear outlet port through which conditioned air is allowed to flow rearward from the middle portion and from both ends of the instrument panel 1 in the vehicle width direction. The discharge passage 67 communicates with a lower outlet port through which condition air is allowed to flow toward the lower side of the instrument panel 1 (toward the lower leg portions of the passenger seated on a front seat). In particular, the discharge passage 67 communicating with the lower outlet port is disposed in a lower rear portion of the air conditioning unit 60 located immediately on the front side of the emergency call device 10.

A beam member 71 of an instrument panel support member (also called as a steering support member) 70 is disposed in the instrument panel 1. The beam member 71 is a reinforcement member extending in the vehicle width direction at a position immediately above the air conditioning unit 60. The beam member 71 is constituted by a pipe member made of e.g. an iron-based material. The beam member 71 connects between a pair of left and right hinge pillars (not illustrated).

Figure 14:
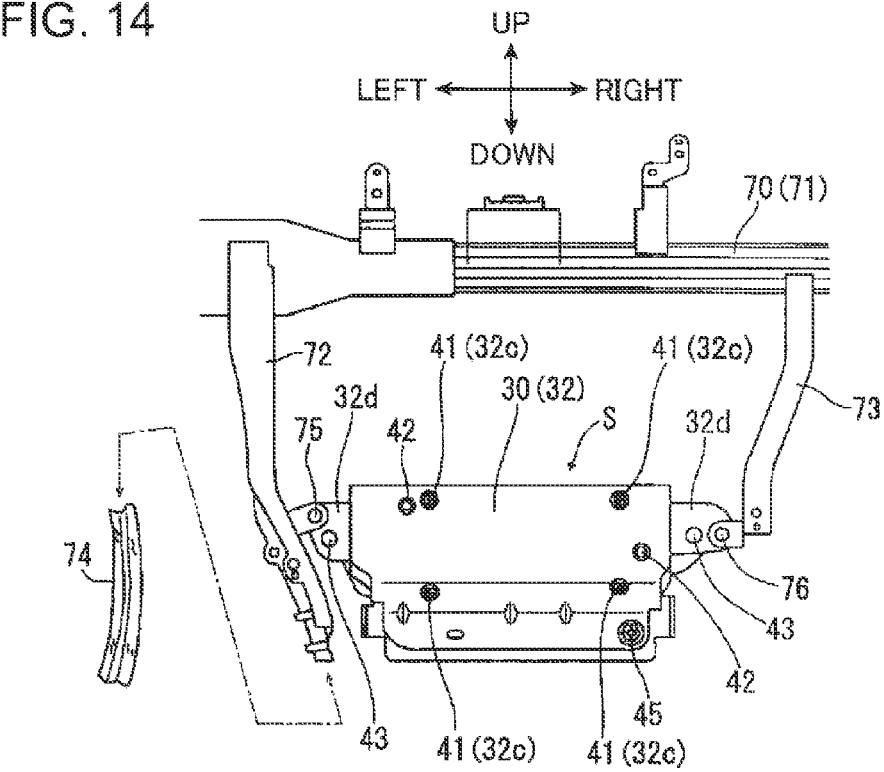
FIG. 14 is a front view illustrating a state that the assembly including the emergency call device is mounted to an instrument panel support member when viewed from the rear side of the vehicle chamber.
Figure 15:
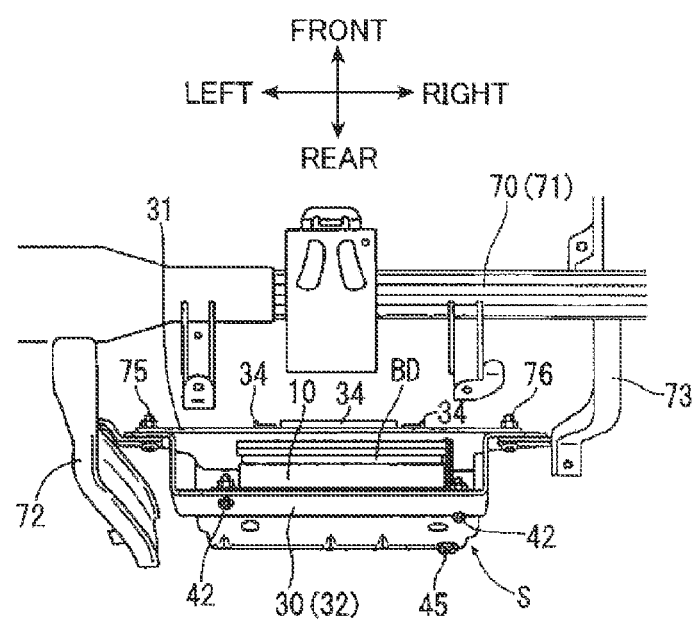
FIG. 15 is a top plan view of FIG. 14 when viewed from above.
Figure 16:
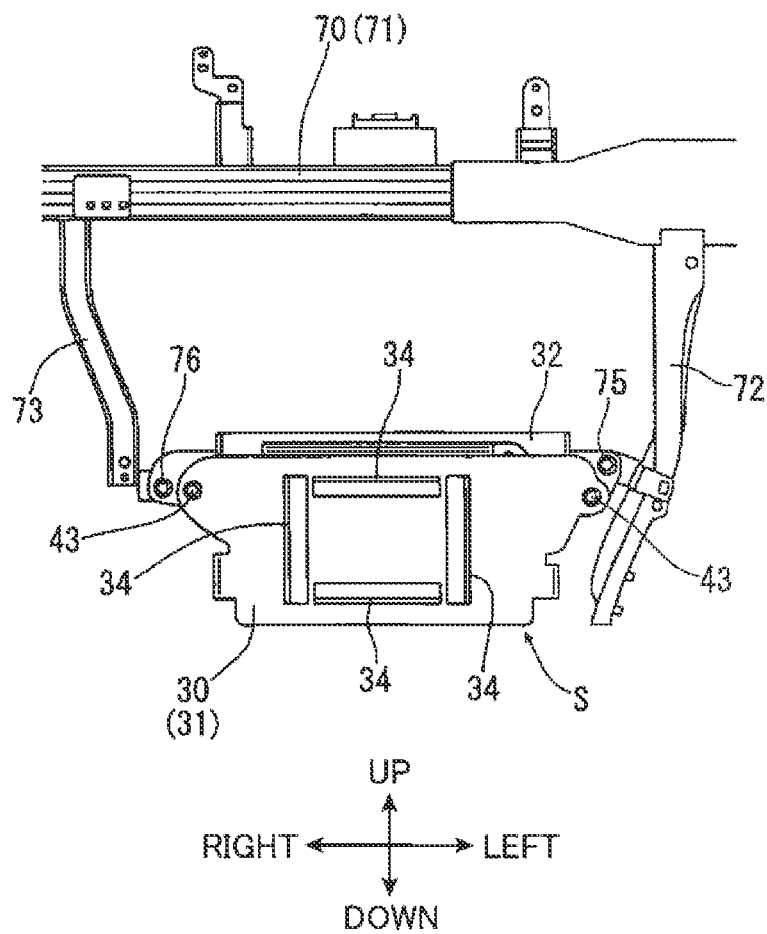
FIG. 16 is a front view of FIG. 14 when viewed from the front side.

The instrument panel support member 70 further includes the center stay 72 and the auxiliary stay 73 whose respective ends are jointed to the center portion of the beam member 71 in the vehicle width direction and the vicinity thereof. The center stay 72 is coupled to one side portion of the tunnel portion 53a via a coupling stay 74 (see FIG. 13 and FIG. 14).

Next, an example of mounting the assembly S including the emergency call device 10 to the vehicle body is described referring to FIGS. 12 to 18. The assembly S is fixed to the center stay 72 and to the auxiliary stay 73. Specifically, one end of the protection member 30 in the vehicle width direction is fixed to the center stay 72 by a screw 75 passing through the mounting hole 32e formed in the rear member 32. Further, the other end of the protection member 30 in the vehicle width direction is fixed to the auxiliary stay 73 by a screw 76 passing through the mounting hole 32f formed in the rear member 32.

The mounting hole 32f is formed into a slit opening to the outer side in the vehicle width direction. According to this configuration, when a large external force is exerted on the assembly S, the screw 76 is relatively easily disengaged from the protection member 30 through the opening end of the mounting hole 32f. On the other hand, the mounting hole 32e is a circular hole without an opening end. Therefore, the screw 75 passing through the mounting hole 32e is less likely to be disengaged. Specifically, in the embodiment, a first fixing unit which firmly fixes the assembly S including the emergency call device 10 to the center stay 72 is constituted by the circular mounting hole 32e formed in one end of the protection member 30 in the vehicle width direction, and the screw 75 passing through the mounting hole 32e. Further, a second fixing unit which relatively weakly fixes the assembly S including the emergency call device 10 to the auxiliary stay 73 (which is capable of easily releasing the fixation) is constituted by the slit-like mounting hole 32f formed in the other end of the protection member 30 in the vehicle width direction, and the screw 76 passing through the mounting hole 32f.

Figure 17:
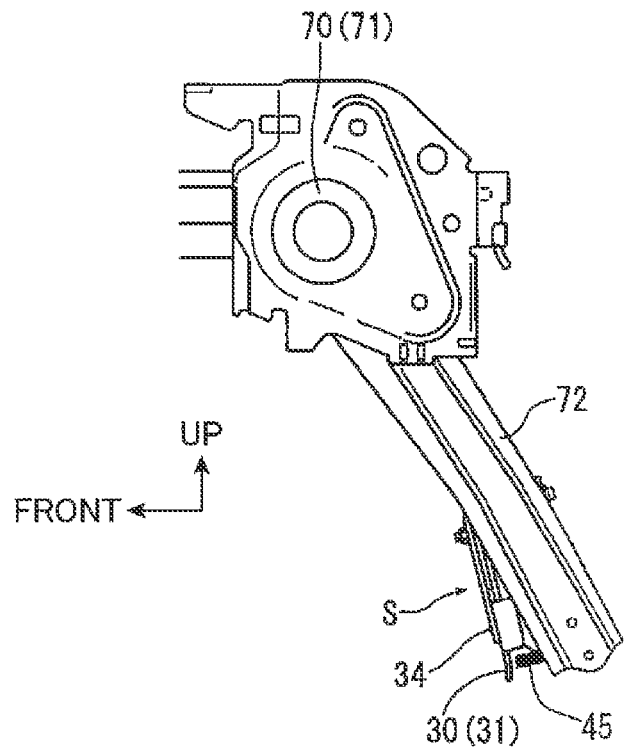
FIG. 17 is a left side view of FIG. 14 when viewed from the left side.
Figure 18:
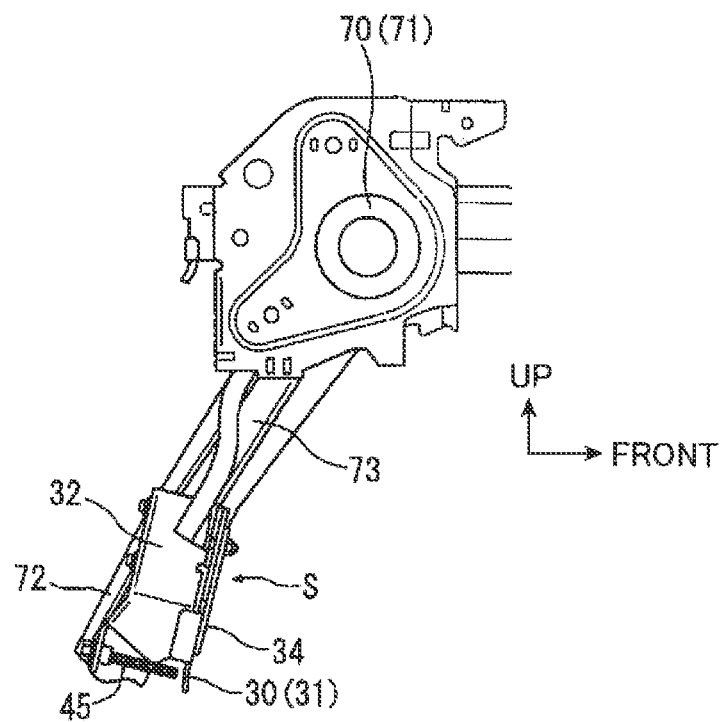
FIG. 18 is a right side view of FIG. 14 when viewed from the right side.
Figure 19:
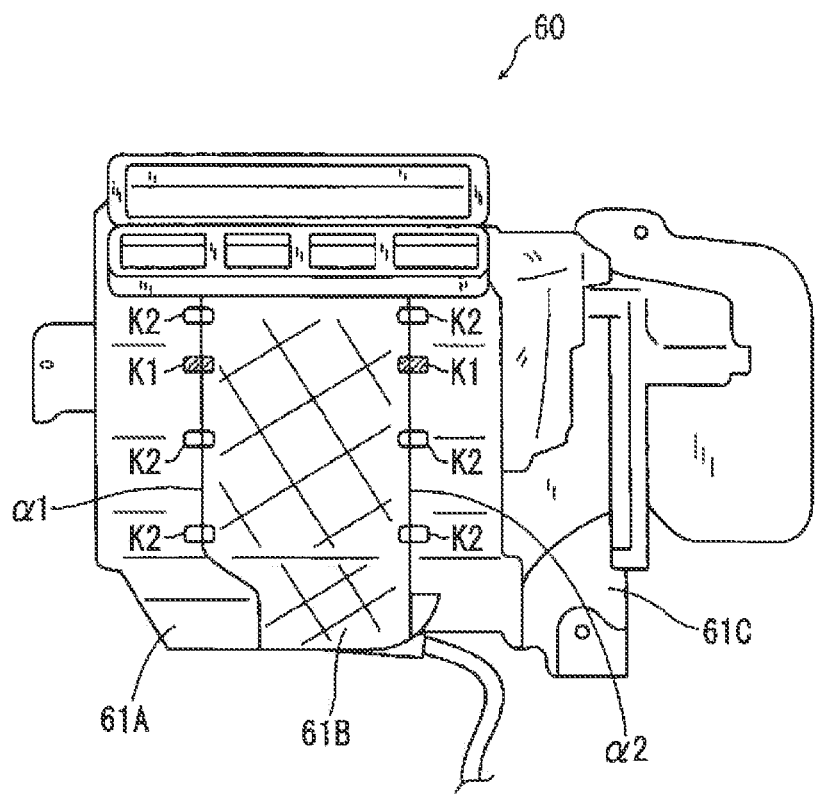
FIG. 19 is a front view illustrating a dividing state of a case of an air conditioning unit.

The center stay 72 and the assembly S are disposed to overlap each other in side view in a state that the assembly S is mounted on each of the stays 72 and 73 (see FIG. 17 and FIG. 18).

The assembly S mounted on each of the stays 72 and 73 is installed in the instrument panel 1 in such a manner that the assembly S is located on the rear side of the air conditioning unit 60. More specifically, the assembly S is disposed immediately on the rear side of the discharge passage 67 of the air conditioning unit 60, and immediately on the front side of the recess portion 4 of the center console 2 (specifically, the upper portion 2B of the center console 2). The lower end of an instrument panel core 1A of the instrument panel 1 is disposed between the assembly S and the recess portion 4. As is well-known, the instrument panel 1 includes the instrument panel core 1A, and an outer cover member 1B constituted of an elastic member or a decorative member to be mounted on the outer surface of the instrument panel core 1A. The outer cover member 1B is detachably attached to the instrument panel core 1A by an attachment method. The outer cover member 1B is divided into plural cover pieces in the vehicle width direction and in the front-rear direction (or in the up-and-down direction). Thus, it is possible to partially remove the outer cover member 1B at an intended position from the instrument panel core 1A.

FIG. 13 illustrates a state that the lower portion of the outer cover member 1B is removed from the instrument panel core 1A, and the center console 2 is removed. Two service holes 1a are formed in the instrument panel core 1A at positions corresponding to the screws 42 of the assembly S in a portion of the instrument panel core 1A where the assembly S is covered from the rear side. A rotary tool is inserted through the service holes 1a for loosening the screws 42 to thereby release the connection (mounting) of the emergency call device 10 with respect to the protection member 30. Further, the stopper member 45 is exposed to the rear side without being covered by the instrument panel core 1A. Therefore, it is possible to remove the stopper member 45 from the rear side.

It is possible to take out the emergency call device 10 including the backup power supply BD together with the connection member 35 to the outside by removing the screws 42 and the stopper member 45 as described above in the state illustrated in FIG. 13. The dismounted emergency call device 10 is assembled into the assembly S again after replacement of the backup power supply BD. The emergency call device 10 is dismounted at least when the valid period (e.g. 5 years) of the backup power supply BD expires. As illustrated in FIG. 13, the state that the service holes 1a and the stopper member 45 are respectively exposed to the rear side may be obtained by removing only the upper portion 2B of the center console 2, without removing the outer cover member 1B from the instrument panel core 1A.

When the emergency call device 10 is mounted to the protection member 30 again, the combination of the emergency call device 10 and the connection member 35 is placed inside the protection member 30 through the opening portion 30a formed in the lower surface of the protection member 30. Then, the connection member 35 and the emergency call device 10 are positioned with respect to the protection member 30 by engaging the heads (convex portions) of the screws 41 projecting from the rear surface of the connection member 35 in the engagement holes 32c formed in the rear member 32 of the protection member 30. Then, the connection member 35 and the emergency call device 10 are fixed to the protection member 30, and the stopper member 45 is mounted to the rear member 32 by attaching the screws 42 to the rear member 32 in this state.

Next, the case 61 of the air conditioning unit 60 is described referring to FIGS. 19 to 23. The case 61 is constituted by assembling case blocks 61A to 61C, which are obtained by dividing the case 61 into plural case blocks (in the embodiment, three case blocks) in the vehicle width direction. It is assumed that α1 is the parting line (borderline) formed between the adjacent case blocks 61A and 61B, and α2 is the parting line (borderline) formed between the adjacent case blocks 61B and 61C. As illustrated in FIG. 13, both of the parting lines α1 and α2 of the case 61 are formed on the front side of the assembly S. In other words, the positions of the parting lines α1 and α2 are set to the positions where the case 61 and the assembly S overlap each other when viewed form the vehicle front side.

The case blocks 61A and 61B, and the case blocks 61B and 61C are connected to each other by connecting the case blocks 61A, 61B, and 61C at engagement segments K2 provided at a number of positions along the parting lines α1 and α2 in a state that the case blocks 61A, 61B, and 61C are positioned at positioning segments K1 provided at e.g. two or more positions along the parting lines α1 and α2.

Figure 20:
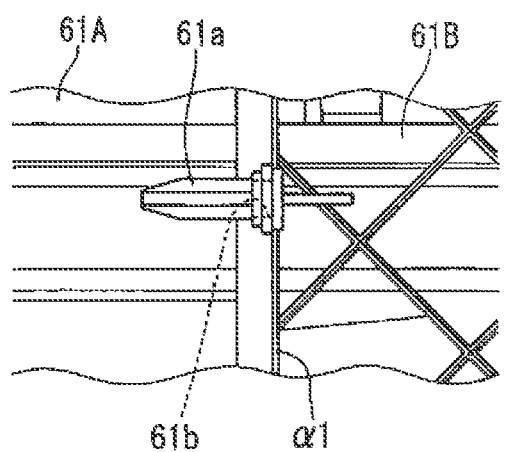
FIG. 20 is a lateral view illustrating a positioning segment between case blocks of the air conditioning unit.
Figure 21:
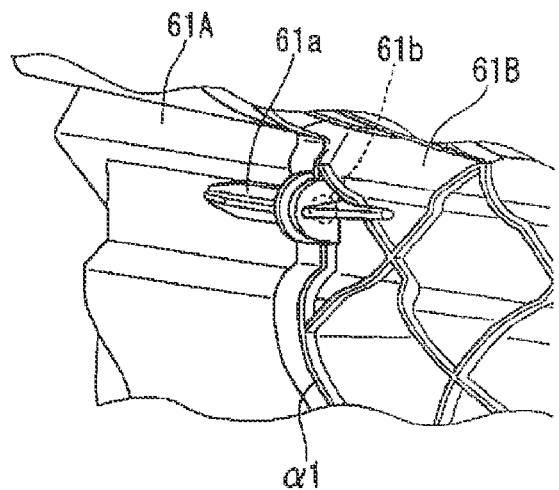
FIG. 21 is a perspective view of the positioning segment in FIG. 20.

The details of the positioning segment K1 are described by a practical example of connecting the case blocks 61A and 61B. The configuration of connecting the case blocks 61B and 61C is the same as the configuration of connecting the case blocks 61A and 61B. As illustrated in FIG. 20 and FIG. 21, a positioning projection 61a is formed on one of the case blocks 61A and 61B (in the embodiment, the case block 61B), and a positioning hole 61b for receiving the positioning projection 61a without play is formed in the other of the case blocks 61A and 61B (in the embodiment, the case block 61A). The case blocks 61A and 61B are positioned to each other by inserting the positioning projection 61a in the positioning hole 61b.

Figure 22:
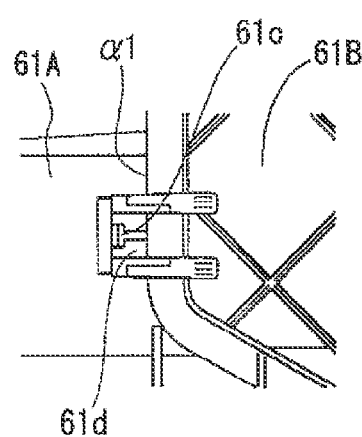
FIG. 22 is a lateral view illustrating an engagement segment between case blocks of the air conditioning unit.
Figure 23:
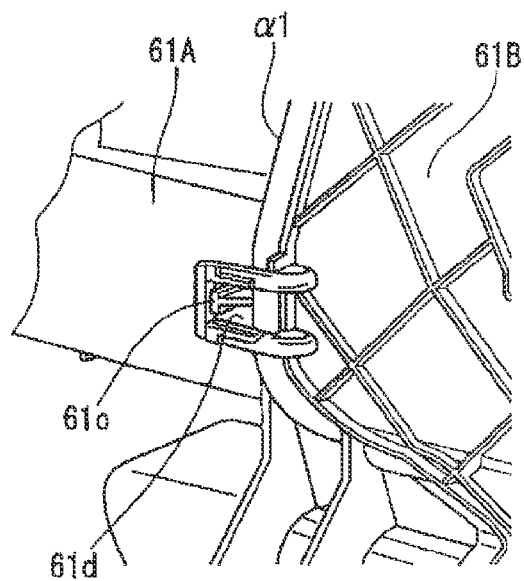
FIG. 23 is a perspective view of the engagement segment illustrated in FIG. 22.

Next, the details of the engagement segment K2 are described by a practical example of connecting the case blocks 61A and 61B. The configuration of connecting the case blocks 61B and 61C is the same as the configuration of connecting the case blocks 61A and 61B. As illustrated in FIG. 22 and FIG. 23, a number of locking projections 61c projecting to the radially outer side are formed circumferentially at a certain interval on one of the case blocks 61A and 61B to be connected (in the embodiment, the case block 61A). A number of locking holes 61d in which the locking projections 61c are engaged are formed in the other of the case blocks 61A and 61B (in the embodiment, the case block 61B). Each of the locking holes 61d is formed into such a shape that the periphery of the hole is closed. Engaging the locking projections 61c in the locking holes 61d makes it possible to firmly connect the case blocks 61A and 61B to each other in the vehicle width direction. The locking projections 61c are engaged in the locking holes 61d while the positioning projections 61a are inserted in the positioning holes 61b.

According to the aforementioned configuration, as illustrated in FIG. 12, the assembly S is mounted to the center stay 72 and to the auxiliary stay 73 having excellent rigidity in a state that the assembly S is mounted to the vehicle. This makes it possible to secure a sufficiently large mounting strength.

Further, when the emergency call device 10 is dismounted from the vehicle body for replacement of the backup power supply BD, for instance, the upper portion 2B of the center console 2 may be removed from the vehicle body so that the stopper member 45 and the service holes 1a are exposed. Thereafter, the combination of the emergency call device 10 and the connection member 35 may be dismounted from the vehicle body, or the combination may be mounted to the vehicle body again by the same steps as described above.

Next, a case when the dashboard panel 50 is retracted at the time of frontal collision of a vehicle is described. In the embodiment, the air conditioning unit 60 including the hollow air passage 62 is installed between the dashboard panel 50 and the assembly S. According to this configuration, when the dashboard panel 50 is retracted, the air passage 62 in the air conditioning unit 60 is crushed. This makes it possible to prevent or suppress that a large external force may be exerted on the emergency call device 10 in the assembly S from the front side. In particular, the discharge passage 67 for feeding conditioned air to the lower leg portions of the passenger is formed immediately on the front side of the assembly S, and the discharge passage 67 has a relatively large space therein. This makes it possible to securely crush and deform the discharge passage 67 so that damage of the emergency call device 10 is effectively prevented or suppressed. In addition to the above, when an external force is exerted on the assembly S from the air conditioning unit 60 from the front side, it is possible to prevent or suppress that a large external force may be directly exerted on the emergency call device 10 by the protecting operation of the protection member 30 (the front member 31 of the protection member 30).

When the retracting air conditioning unit 60 comes into contact with the front member 31 of the protection member 30, the protrusions 34 formed on the front surface of the front member 31 positively break the case 61 of the air conditioning unit 60 (fragments the case 61 into small pieces). In particular, in the embodiment, the case 61 of the air conditioning unit 60 is divided into the case blocks 61A to 61C, and the parting lines α1 and α2 are formed between the respective adjacent case blocks. Therefore, as the air conditioning unit 60 is retracted, the case 61 is relatively easily fragmented along the parting lines α1 and α2. Further, the engagement segments K2 (portions for connecting the case blocks) of the case 61 are disposed on the front side of the assembly S. Therefore, as the engagement segments K2 come into contact with the assembly S, connection by the engagement segments K2 is relatively easily released. This promotes fragmentation of the case 61. Thus, the aforementioned configuration is advantageous in preventing or suppressing that a large external force may be exerted on the emergency call device 10 from the air conditioning unit 60.

A gap is formed between the front member 31 of the protection member 30, and the emergency call device 10 in the front-rear direction. Formation of the gap is also advantageous in preventing or suppressing that a large external force may be exerted on the emergency call device 10 via the front member 31.

The hollow recess portion 4 for placing small articles is formed immediately on the rear side of the assembly S. According to this configuration, even when the assembly S is retracted, the recess portion 4 is crushed and deformed. This makes it possible to prevent or suppress damage of the emergency call device 10. Further, the rear member 32 constituting a part of the protection member 30 is formed on the rear side of the emergency call device 10. This makes it possible to avoid direct contact of the emergency call device 10 with a rigid member such as the shift lever 3, which is disposed on the rear side of the assembly S. Also, in this sense, the aforementioned configuration is advantageous in protecting the emergency call device 10. The emergency call device 10 is covered by the protection member 30 from the front side and from the rear side. Therefore, even if the assembly S is sandwiched between the air conditioning unit 60 and the shift lever 3, it is possible to prevent or suppress damage of the emergency call device 10 itself.

When a large external force of retracting the assembly S is exerted from a state that the recess portion 4 is crushed and deformed, although the connection between the auxiliary stay 73 and the protection member 30 is released, the connection between the center stay 72 and the protection member 30 is maintained. Specifically, in the embodiment, the auxiliary stay 73, and the rear member 32 of the protection member 30 are connected to each other via the relatively weak second fixing unit constituted by the slit-like mounting hole 32f having an opening end, and the screw 76 (a fastening member) passing through the mounting hole 32f; and the center stay 72 and the rear member 32 of the protection member 30 are connected to each other via the relatively strong first fixing unit constituted by the circular mounting hole 32e without an opening end, and the screw 75 passing through the mounting hole 32e. According to this configuration, when a large external force of retracting the assembly S is exerted, only the connection at the second fixing unit is released, and the connection at the first fixing unit is not released. As a result, the assembly S is separated from the auxiliary stay 73 while connection to the center stay 72 is maintained. This makes it possible to retract the assembly S, while pivotally moving the assembly S downward around the connecting portion (first fixing unit) with respect to the center stay 72. In other words, the assembly S is moved rearward, accompanied by pivotal movement of the assembly S such that the right portion of the assembly S is moved downward and leftward. Causing the retracting movement accompanied by pivotal movement as described above makes it possible to prevent or suppress contact of the assembly S with the shift lever 3 as a rigid member. Even if the assembly S comes into contact with the shift lever 3, it is possible to prevent damage of the emergency call device 10, because the rear side of the emergency call device 10 is covered by the rear member 32 of the protection member 30. In other words, not the emergency call device 10 but the rear member 32 comes into direct contact with the shift lever 3.

The stopper member 45 projecting toward the front member 31 is mounted on the rear member 32. This makes it possible to prevent or suppress approximation between the front member 31 and the rear member 32 in the front-rear direction. This makes it possible to prevent or suppress that the emergency call device 10 may be strongly sandwiched between the front member 31 and the rear member 32 in the front-rear direction.

The instrument panel support member 70 having high rigidity is disposed near the assembly S, and the assembly S is fixed to the center stay 72 of the instrument panel support member 70. This is advantageous in protecting the assembly S at the time of frontal collision of a vehicle or at the time of lateral collision of a vehicle. Further, the assembly S is disposed to overlap the center stay 72 in side view. This configuration is particularly preferable in protecting the emergency call device 10 at the time of lateral collision of a vehicle.

The relatively wide opening portion 30*a* is formed in the lower surface of the protection member 30 as an opening portion for mounting and dismounting. This makes it easy to dismountably mount the emergency call device 10, and to prevent or suppress damage of the harnesses connected to the connector portions 15 to 17 of the emergency call device 10 at the time of vehicle collision.

A preferred embodiment of the invention has been described as above. However, the invention is not limited by the embodiment, and various modifications are applicable to the invention in the scope of the claims as defined hereinafter. Further, an object of the invention is not limited to an explicitly described one, but implicitly includes providing any technical matter expressed as a preferred or advantageous feature.

For instance, the connecting portion (first fixing unit) between the assembly S (the emergency call device 10 and the protection member 30), and the center stay 72 may have a structure in which the connection is easily released when a large external force is exerted, as well as the connecting portion (second fixing unit) between the assembly S and the auxiliary stay 73. The mechanism for facilitating release of the connection is not only limited to the configuration, in which a slit-like mounting hole such as the mounting hole 32*f* in the embodiment is used, but also includes using an appropriate weakening means such that a recess portion is partially formed in a screw for fixation so that the screw is easily broken. Conversely, it is possible to increase the connection strength by forming a mounting hole without an opening end in both of the first fixing unit and the second fixing unit.

It is not necessarily required to mount the assembly S to the center stay 72 and to the auxiliary stay 73. For instance, the assembly S may be mounted to the beam member 71. Further, the assembly S may be mounted to a component other than the instrument panel support member 70. For instance, it is possible to mount the assembly S to an appropriate member such as the instrument panel core 1A or the front wall of the center console 2.

In the embodiment, the assembly S is installed in the instrument panel 1. Alternatively, it is possible to install the assembly S at an appropriate position in the vehicle chamber such as the inside of a side wall of the rear portion of the vehicle. In this case, the emergency call device 10 may be surrounded by the protection member 30 in a direction in which an external force is particularly likely to be exerted at the time of vehicle collision.

It is possible to directly fix the emergency call device 10 to the protection member 30, without using the connection member 35. Alternatively, the protection member 30 may be omitted. Further alternatively, the emergency call device 10 may exclude a backup power supply BD.

The case 61 of the air conditioning unit 60 may be divided in the up-down direction, in place of the vehicle width direction. When there are two or more parting lines on the case 61 as exemplified in the embodiment, not all the parting lines are required to overlap the assembly S in front view, but at least one of the parting lines may overlap the assembly S.

The stopper member 45 may be mounted at an appropriate position of the protection member 30, in place of the lower end of a side portion of the protection member 30. For instance, the stopper member 45 may be provided at two or more positions of the protection member 30 surrounding the emergency call device 10. Alternatively, it is possible to constitute the stopper member 45 by using a component other than a bolt.

The following is a summary of the features and the advantageous effects of the installation structure for a vehicle-mounted device in the embodiment.

An installation structure for a vehicle-mounted device in the embodiment is provided with: an air conditioning unit disposed on a rear side of a dashboard panel separating an engine room and a vehicle chamber, and internally including an air passage through which conditioned air is allowed to flow; and an emergency call device disposed on a rear side of the air conditioning unit, and configured to perform an emergency call to a service center on an outside of a vehicle at a time of vehicle collision.

According to the aforementioned configuration, it is possible to install the emergency call device, while effectively using the space on the rear side of the dashboard panel and on the rear side of the air conditioning unit. Further, even when the emergency call device is pressed rearward by the air conditioning unit, as the dashboard panel is retracted at the time of frontal collision of the vehicle, the air conditioning unit including the hollow air passage is easily crushed and deformed. This is advantageous in preventing or suppressing damage of the emergency call device.

Preferably, the installation structure for a vehicle-mounted device may be further provided with a protection member which covers a front surface of the emergency call device.

According to this configuration, the existence of the protection member makes it possible to prevent direct contact of the air conditioning unit with the emergency call device when the air conditioning unit is retracted. This is advantageous in preventing or suppressing damage of the emergency call device.

Preferably, the air conditioning unit may include a case constituting an outer shell of the air conditioning unit. The case may include a plurality of case blocks obtained by dividing the case in a vehicle width direction or in an up-down direction. A parting line formed between the adjacent case blocks may be disposed on a front side of the emergency call device.

According to this configuration, the case of the air conditioning unit is easily fragmented along the parting line when the air conditioning unit comes into contact with the protection member. This is advantageous in preventing or suppressing damage of the emergency call device.

Preferably, an engagement segment which connects between the adjacent case blocks may be disposed at a position where the engagement segment and the protection member overlap each other in a vehicle front view.

According to this configuration, connection between the adjacent case blocks at the engagement segment is easily released, as the protection member comes into contact with the air conditioning unit. This is advantageous in promoting fragmentation of the case of the air conditioning unit.

Preferably, a front surface of the protection member may include a protrusion configured to come into contact with the air conditioning unit and thereby promote breakage of the air conditioning unit when the air conditioning unit is retracted at the time of frontal collision of the vehicle.

According to this configuration, the protrusion projecting on the front surface of the protection member promotes breakage of the air conditioning unit. This is advantageous in protecting the emergency call device.

Preferably, the protection member may be formed to cover not only the front surface of the emergency call device but also a rear surface of the emergency call device.

According to this configuration, when a rigid member is disposed on the rear side of the emergency call device, the existence of the protection member prevents direct contact of the emergency call device with the rigid member located on the rear side. This is advantageous in protecting the emergency call device.

Preferably, a gap may be formed between the protection member and the front surface of the emergency call device.

According to this configuration, the existence of the gap makes it possible to prevent or suppress that the protection member presses the emergency call device rearward when a rearward external force is exerted on the protection member from the air conditioning unit. This is advantageous in protecting the emergency call device.

Preferably, the installation structure for a vehicle-mounted device may be further provided with an instrument panel support member which supports an instrument panel. The instrument panel support member may include: a beam member extending in a vehicle width direction in a front portion of the vehicle chamber; and a center stay which connects between the beam member and a vehicle body floor at a vehicle-widthwise center portion of the instrument panel support member. The emergency call device may be fixed to at least the center stay via a first fixing unit.

According to the aforementioned configuration, the emergency call device is installed near the vehicle-widthwise center position of the front portion of the vehicle chamber. This is advantageous in protecting the emergency call device at the time of lateral collision of the vehicle. Further, the emergency call device is fixed to the center stay which has high rigidity and which is less likely to be deformed. This is advantageous in protecting the emergency call device at the time of frontal collision of the vehicle. In addition to the above, it is possible to fix the emergency call device, while effectively using the existing instrument panel support member.

Preferably, the instrument panel support member may include an auxiliary stay fixed to the beam member at a position away from the center stay in the vehicle width direction, and the emergency call device may be fixed to the auxiliary stay via a second fixing unit.

In this way, fixing the emergency call device to the auxiliary stay disposed laterally with respect to the center stay, as well as to the center stay, is advantageous in protecting the emergency call device.

Preferably, the first and second fixing units may be configured such that the fixation by the second fixing unit is easily released, as compared with the fixation by the first fixing unit when an external force is exerted at the time of vehicle collision.

In this way, configuring the installation structure such that the fixation by the second fixing unit is easily released, as the external force is exerted at the time of vehicle collision is advantageous in preventing or suppressing that a large external force may be directly exerted on the emergency call device.

Preferably, the second fixing unit may include a slit-like mounting hole having an opening end, and a fastening member passing through the mounting hole.

According to this configuration, it is possible to promote release of the fixation by the second fixing unit with a simplified configuration, in which a mounting hole for passing a fastening member therethrough is formed into a slit shape.

Preferably, the emergency call device may be disposed at a position where the emergency call device overlaps the center stay in side view.

The aforementioned configuration is advantageous in protecting the emergency call device by the center stay having high rigidity particularly at the time of lateral collision of the vehicle.

Preferably, the protection member may include an opening portion for mounting and dismounting, through which the emergency call device is allowed to pass, the opening portion being formed such that the emergency call device is dismountably mounted to the protection member therethrough.

In this way, forming the opening portion in the protection member makes it easy to dismountably mount the emergency call device to the protection member through the opening portion.

Preferably, the emergency call device may be fixed to the protection member via a connection member. The opening portion may have a size capable of passing a combination of the emergency call device and the connection member therethrough so that the combination is dismountably mounted to the protection member through the opening portion. An opening direction of the opening portion may be set in a direction different from a mounting direction in which the protection member is mounted to a vehicle body.

According to this configuration, fixing the combination of the emergency call device and the connection member to the protection member makes it possible to form an assembly in which the emergency call device, the connection member, and the protection member are integrally assembled. This makes it possible to collectively mount the assembly to the vehicle body. Further, the mounting direction in which the assembly is mounted to the vehicle body is different from the mounting/dismounting direction in which the combination of the emergency call device and the connection member is dismountably mounted to the protection member. This is preferable in enhancing the layout freedom.

Preferably, the protection member may be formed such that a width of one end of the protection member which defines the opening portion is set larger than a width of the other portion thereof. The emergency call device may include a connector portion. The connector portion may be disposed to face the opening portion in a state that the emergency call device is fixed to the protection member.

In this way, forming the wide opening portion makes it easy to dismountably mount the emergency call device, and makes it easy to connect or disconnect a harness for the emergency call device to or from the connector portion. Further, forming the wide opening portion is advantageous in preventing or suppressing damage of the harness at the time of vehicle collision.

Preferably, the installation structure for a vehicle-mounted device may be further provided with a stopper member mounted on the protection member in such a manner as to extend in a front-rear direction while traversing the opening portion.

According to this configuration, even when the protection member is to be deformed to such an extent that the wide opening portion is narrowed, as the external force is exerted at the time of vehicle collision, it is possible to prevent or suppress the deformation by the stopper member. When the emergency call device is dismountably mounted to the protection member, the stopper member may be dismounted from the protection member in advance.

This application is based on Japanese Patent application No. 2014-255955 filed in Japan Patent Office on Dec. 18, 2014, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

INDUSTRIAL APPLICABILITY

As described above, the invention is useful in securely operating an emergency call device at the time of vehicle collision.

The invention claimed is:

1. An installation structure for a vehicle-mounted device, comprising:
    an air conditioning unit disposed on a rear side of a dashboard panel separating an engine room and a vehicle chamber, and internally including an air passage through which conditioned air is allowed to flow;
    an emergency call device disposed on a rear side of the air conditioning unit, and configured to perform an emergency call to a service center on an outside of a vehicle at a time of vehicle collision; and
    a protection member which covers a front surface of the emergency call device.

2. The installation structure for a vehicle-mounted device according to claim 1, wherein
    the air conditioning unit includes a case constituting an outer shell of the air conditioning unit,
    the case includes a plurality of case blocks obtained by dividing the case in a vehicle width direction or in an up-down direction, and
    a parting line formed between the adjacent case blocks is disposed on a front side of the emergency call device.

3. The installation structure for a vehicle-mounted device according to claim 2, wherein
    an engagement segment which connects between the adjacent case blocks is disposed at a position where the engagement segment and the protection member overlap each other in a vehicle front view.

4. The installation structure for a vehicle-mounted device according to claim 3, wherein
    the protection member is formed to cover not only the front surface of the emergency call device but also a rear surface of the emergency call device.

5. The installation structure for a vehicle-mounted device according to claim 4, wherein
    a gap is formed between the protection member and the front surface of the emergency call device.

6. The installation structure for a vehicle-mounted device according to claim 1, wherein
    the protection member is formed to cover not only the front surface of the emergency call device but also a rear surface of the emergency call device.

7. The installation structure for a vehicle-mounted device according to claim 6, wherein
    a gap is formed between the protection member and the front surface of the emergency call device.

8. The installation structure for a vehicle-mounted device according to claim 1, wherein
    a front surface of the protection member includes a protrusion configured to come into contact with the air conditioning unit and thereby promote breakage of the air conditioning unit when the air conditioning unit is retracted at the time of frontal collision of the vehicle.

9. The installation structure for a vehicle-mounted device according to claim 1, further comprising:
    an instrument panel support member which supports an instrument panel, wherein
    the instrument panel support member includes:
        a beam member extending in a vehicle width direction in a front portion of the vehicle chamber; and
        a center stay which connects between the beam member and a vehicle body floor at a vehicle-widthwise center portion of the instrument panel support member, and
    the emergency call device is fixed to at least the center stay via a first fixing unit.

10. The installation structure for a vehicle-mounted device according to claim 9, wherein
    the instrument panel support member includes an auxiliary stay fixed to the beam member at a position away from the center stay in the vehicle width direction, and
    the emergency call device is fixed to the auxiliary stay via a second fixing unit.

11. The installation structure for a vehicle-mounted device according to claim 10, wherein
    the first and second fixing units are configured such that the fixation by the second fixing unit is easily released, as compared with the fixation by the first fixing unit when an external force is exerted at the time of vehicle collision.

12. The installation structure for a vehicle-mounted device according to claim 10, wherein the second fixing unit includes a slit-like mounting hole having an opening end, and a fastening member passing through the mounting hole.

13. The installation structure for a vehicle-mounted device according to claim 9, wherein
the emergency call device is disposed at a position where the emergency call device overlaps the center stay in side view.

14. The installation structure for a vehicle-mounted device according to claim 6, wherein
the protection member includes an opening portion for mounting and dismounting, through which the emergency call device is allowed to pass, the opening portion being formed such that the emergency call device is dismountably mounted to the protection member therethrough.

15. The installation structure for a vehicle-mounted device according to claim 14, wherein
the emergency call device is fixed to the protection member via a connection member,
the opening portion has a size capable of passing a combination of the emergency call device and the connection member therethrough so that the combination is dismountably mounted to the protection member through the opening portion, and
an opening direction of the opening portion is set in a direction different from a mounting direction in which the protection member is mounted to a vehicle body.

16. The installation structure for a vehicle-mounted device according to claim 14, wherein
the protection member is formed such that a width of one end of the protection member which defines the opening portion is set larger than a width of the other portion thereof,
the emergency call device includes a connector portion, and
the connector portion is disposed to face the opening portion in a state that the emergency call device is fixed to the protection member.

17. The installation structure for a vehicle-mounted device according to claim 14, further comprising:
a stopper member mounted on the protection member in such a manner as to extend in a front-rear direction while traversing the opening portion.

18. An installation structure for a vehicle-mounted device, comprising:
an instrument panel support member which supports an instrument panel; and
an emergency call device mounted on the instrument panel support member, and configured to perform an emergency call to a service center on an outside of a vehicle at a time of vehicle collision, wherein
the instrument panel support member includes:
a beam member extending in a vehicle width direction in a front portion of a vehicle chamber;
a center stay which connects between the beam member and a vehicle body floor at a vehicle-widthwise center portion of the instrument panel support member; and
an auxiliary stay fixed to the beam member at a position away from the center stay in the vehicle width direction,
the emergency call device is fixed to the center stay via a first fixing unit, and is fixed to the auxiliary stay via a second fixing unit,
the first and second fixing units are configured such that the fixation by the second fixing unit is easily released, as compared with the fixation by the first fixing unit when an external force is exerted at the time of vehicle collision,
the second fixing unit includes a slit-like mounting hole having an opening end, and a fastening member passing through the mounting hole, and
the emergency call device is disposed at a position where the emergency call device overlaps the center stay in side view.

19. An installation structure for a vehicle-mounted device, comprising:
an emergency call device which performs an emergency call to a service center on an outside of a vehicle at a time of vehicle collision;
a protection member formed to surround the emergency call device; and
a connection member which connects between the emergency call device and the protection member, wherein
the protection member includes an opening portion for mounting and dismounting, through which a combination of the emergency call device and the connection member is allowed to pass, the combination being dismountably mounted to the protection member through the opening portion,
an opening direction of the opening portion is set in a direction different from a mounting direction in which the protection member is mounted to a vehicle body,
the protection member is formed such that a width of one end of the protection member which defines the opening portion is set larger than a width of the other portion thereof,
the emergency call device includes a connector portion,
the connector portion is disposed to face the opening portion in a state that the emergency call device is fixed to the protection member via the connection member, and
the installation structure further includes a stopper member mounted on the protection member in such a manner as to extend in a front-rear direction while traversing the opening portion.

* * * * *